W. V. ANDERSON.
FERTILIZING ATTACHMENT FOR CULTIVATORS.
APPLICATION FILED JUNE 15, 1912.
1,050,593.
Patented Jan. 14, 1913.
2 SHEETS—SHEET 1.
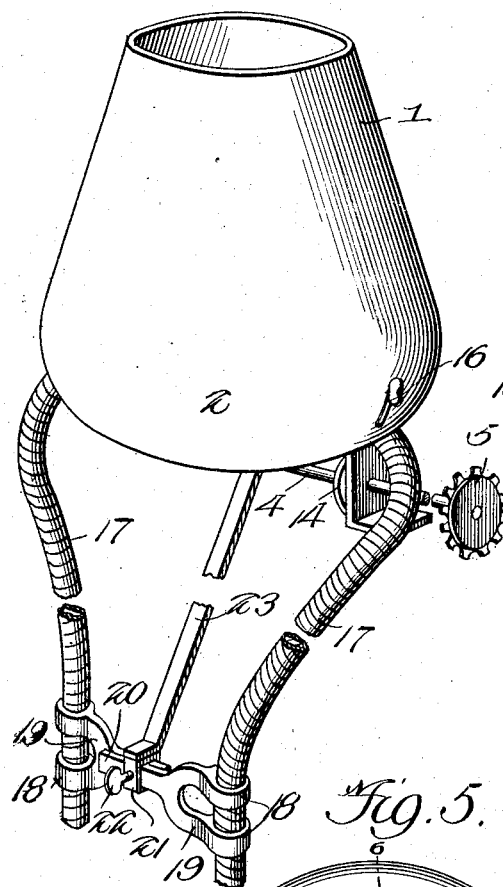
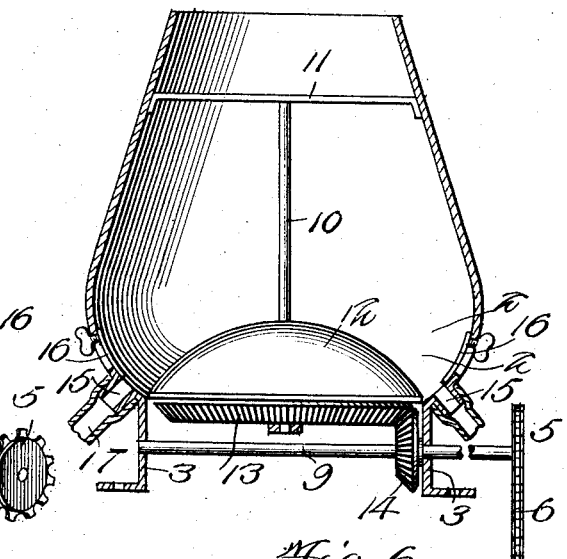
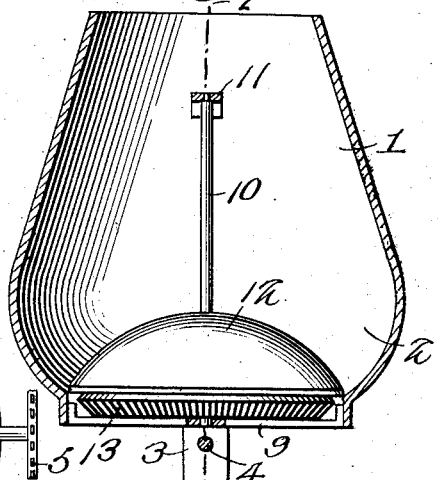
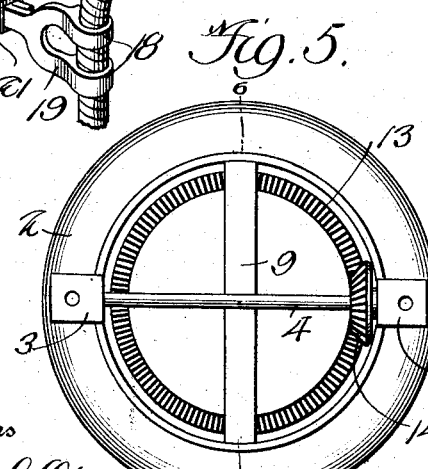
Witnesses
Hugh Ott
Inventor
William V. Anderson
By Victor J. Evans
Attorney W. V. ANDERSON.
FERTILIZING ATTACHMENT FOR CULTIVATORS.
APPLICATION FILED JUNE 15, 1912.
1,050,593.
Patented Jan. 14, 1913.
2 SHEETS—SHEET 2.
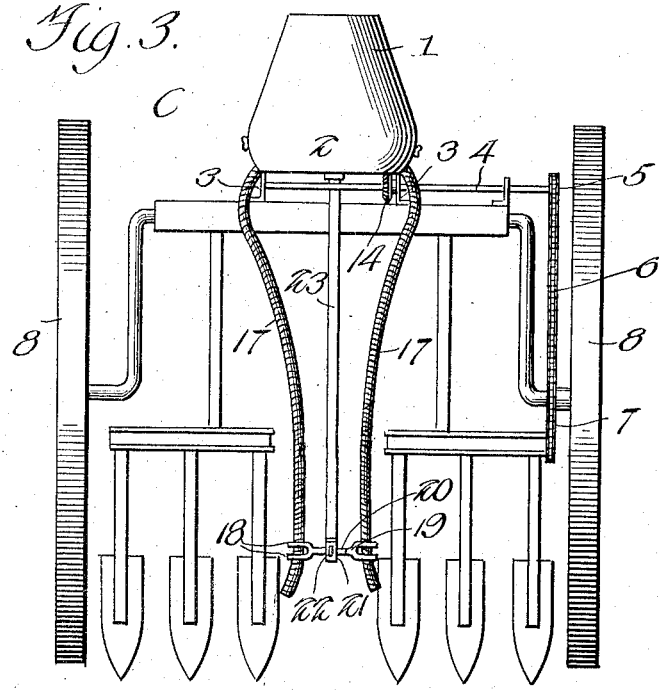
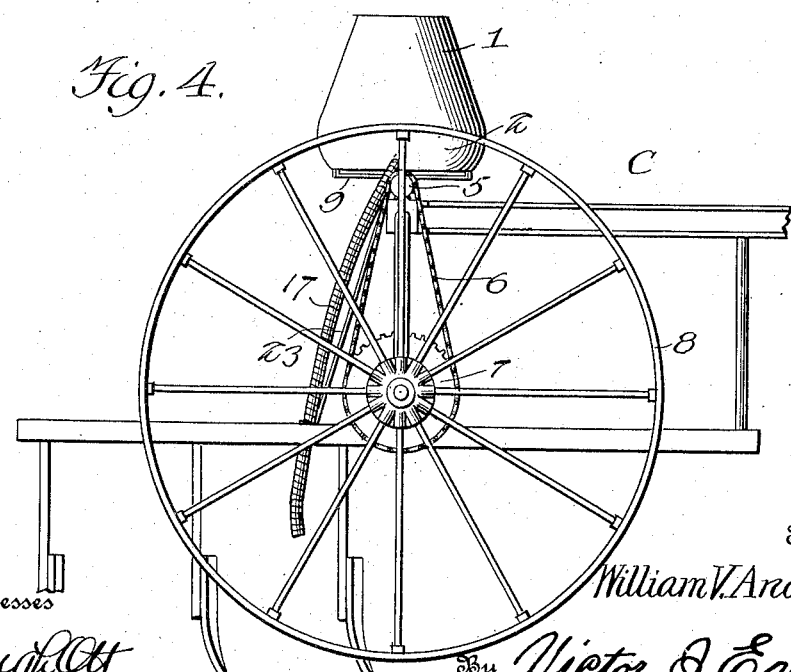
Witnesses
Inventor
William V. Anderson
By Victor J. Evans
Attorney

UNITED STATES PATENT OFFICE.

WILLIAM V. ANDERSON, OF PULASKI, KENTUCKY.

FERTILIZING ATTACHMENT FOR CULTIVATORS.

1,050,593.  Specification of Letters Patent.  Patented Jan. 14, 1913.

Application filed June 15, 1912. Serial No. 703,845.

*To all whom it may concern:*

Be it known that I, WILLIAM V. ANDERSON, a citizen of the United States, residing at Pulaski, in the county of Pulaski and State of Kentucky, have invented new and useful Improvements in Fertilizing Attachments for Cultivators, of which the following is a specification.

This invention relates to fertilizer distributers, and it has for its object to produce a simple and efficient device adapted to be applied to and used in connection with any ordinary horse cultivator, whether adapted to be drawn by one or two draft animals, for the purpose of supplying fertilizing material in proximity to the roots of the plants cultivated by the implement.

A further object of the invention is to produce a simple and effective device for distributing fertilizing material adapted to be used in connection with a cultivator and provided with means whereby the distributing tubes or ducts may be gaged or adjusted to correspond with the gage of the cultivator so as to deposit the fertilizing material in proximity to the roots of the plants that are being cultivated.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a perspective view showing a simple and preferred form of the improved fertilizing device detached. Fig. 2 is a vertical sectional view of the same taken on the line 2—2 in Fig. 6. Fig. 3 is a rear elevation showing the fertilizer distributer applied to a cultivator in position for operation. Fig. 4 is a side elevation of the same. Fig. 5 is a bottom plan view of the fertilizing device, detached. Fig. 6 is a sectional detail view taken on the line 6—6 in Fig. 5.

Corresponding parts in the several figures are denoted by like characters of reference.

The hopper 1 which is of substantially frusto-conical shape, but which is rounded and contracted at its lower end to present a bellied portion 2, is provided with downwardly extending bracket members 3, 3 at the sides thereof, said bracket members supporting the drive shaft 4 carrying a sprocket wheel 5 which may be connected by a chain 6 with a sprocket wheel 7 associated with one of the transporting wheels 8 of a cultivator C in connection with which the device is used. In the drawing an ordinary conventional two-horse cultivator has been shown; when a one-horse cultivator is used which is provided with a single driving wheel, motion may be derived in any convenient manner from such driving wheel for the purpose of rotating the shaft 4. A longitudinal cross bar 9 at the lower end of the hopper 1 affords a step or support for the lower end of a shaft 10, the upper end of which may be supported for rotation in a cross bar 11 of the hopper. The shaft 10 carries the bottom member 12 which has a convex upper surface whereby the contents of the hopper will be guided in the direction of the circumference of the latter. The bottom member 12 is equipped with a bevel gear 13 meshing with a bevel pinion 14 on the shaft 4 from which rotary motion will be transmitted to the bottom member 12.

The hopper 1 is provided at diametrically opposite sides thereof, and adjacent to the edge of the bottom member 12, with discharge apertures 15, the area of which may be regulated by adjustable valves or shutters 16. Flexible discharge tubes or spouts 17 are connected at their upper ends with the discharge apertures 15. Each of the discharge tubes or ducts 17 is provided with a clamping member comprising collars 18 encircling the tube, said collars being connected together by a bar 19 having a laterally extending arm 20. The arms 20 of the two clamping members are surrounded by a sleeve 21 having a set screw 22 which may be tightened for the purpose of securing the arms 20 in adjusted position within the sleeve. By this simple mechanism, the discharge tubes or ducts 17 may be readily adjusted and spaced at various distances apart, said tubes or ducts being also secured in adjusted position by the set screw 22. The sleeve 21 may be connected by a bracket 23 with the cross bar 9, thereby supporting the tube clamping and adjusting members in proper position for operation.

The improved device may be mounted and supported in any convenient position upon any cultivator of ordinary construction, it being understood that while in the drawings it has been shown as being mounted upon the frame of a conventional two-horse cultivator, the precise arrangement may be varied to any desired extent.

When the cultivator is in operation motion is transmitted to the shaft 4 whereby the bottom member 12 is rotated, the contents of the hopper being thereby agitated and guided toward the discharge apertures 15, the area of which is regulated by the valves or shutters 16, the latter permitting a desired and predetermined quantity of the fertilizing material to escape into the tubes or ducts whereby it is conveyed to the ground. It is understood that the lower ends of the ducts are to be adjusted in proximity to the cultivator shovels which operate nearest the plants, so that the fertilizing material will be deposited in the most advantageous position to promote the growth of the plants. It will also be understood that the fertilizer ducts are capable of being independently adjusted to the most advantageous or to any desired position.

Owing to the approximately frusto-conical shape of the hopper taken in connection with the convex faced bottom member, the contents of the hopper will by the rotation of the bottom member be guided outwardly into the bellied lower portion of the hopper where the discharge apertures are located, the contents of the hopper and especially of the outwardly bellied lower portion thereof being thus kept in a constant agitation which promotes the discharge of said contents through the discharge apertures and into the ducts.

Having thus described the invention, what is claimed as new, is:—

1. A fertilizer hopper of approximately frusto-conical shape having downwardly extending diametrically opposite bracket members, a longitudinal cross bar intermediate said bracket members and an interior cross bar, a vertical axial shaft supported for rotation in the cross bars and having a bottom member and a bevel gear associated therewith, said bottom member having a convex upper face, a driven shaft supported for rotation in the diametrically opposite bracket members and carrying a pinion meshing with the bevel gear on the vertical axial shaft, valved discharge apertures in the hopper adjacent to the bottom member, flexible discharge ducts associated with the discharge apertures, and adjusting means for the discharge ducts supported by the longitudinal cross bar.

2. In a fertilizer distributer, a hopper having discharge apertures and a longitudinal cross bar, flexible ducts associated with the discharge apertures, clamp members connected with the ducts and having laterally extending arms, a bracket depending from the longitudinal cross bar and having a terminal sleeve through which the arms of the clamp members extend, and a set screw in said sleeve to secure the arms in adjusted position.

In testimony whereof I affix my signature in presence of two witnesses.

WILLIAM V. ANDERSON.

Witnesses:
C. F. SMITH,
JOE H. GIBSON.

---

Copies of this patent may be obtained for five cents each, by addressing the "Commissioner of Patents, Washington, D. C."